Patented Nov. 25, 1930

1,782,755

UNITED STATES PATENT OFFICE

WILLIAM L. S. WILLIAMS, OF HILO, TERRITORY OF HAWAII, ASSIGNOR TO HAWAIIAN CANE PRODUCTS, LIMITED, OF HILO, HAWAII, A CORPORATION OF THE TERRITORY OF HAWAII

METHOD OF TREATING BAGASSE FOR THE MANUFACTURE OF WALL BOARD AND THE LIKE

No Drawing.   Application filed August 9, 1929.   Serial No. 384,803.

This invention relates to a process for the treatment of sugar cane bagasse in the manufacture of insulation board and other products. Its object is to provide a process whereby sugar cane bagasse produced by the methods of crushing sugar cane between rollers for the extraction of the sugar bearing juices, or slicing sugar cane and extracting the sugar bearing juices by diffusion, or combinations of the above methods, is treated in a manner which is new and economical and which results in the production of insulation board and other products of a strength, quality, and appearance superior to similar products produced from sugar cane bagasse by other methods.

For the thorough understanding of this process, the following description is necessary. The sugar cane stalk consists of the rind, made up of fibrous matter coated with a waxy substance containing a large proportion of silicia; the nodes, made up of interwoven fibres; and the internodes, comprising long fibrous matter or vascular bundles interspersed with non-fibrous pith cells. In the natural state, the rind fibres, node fibres, and internode fibres and pith cells all contain sugar bearing juices, and are bound together by a ligneous substance. In the extraction of the sugar bearing juices, for the purpose of manufacturing cane sugar, the sugar cane stalks are cut, sliced, ground, crushed, macerated, and broken up, so that the resulting bagasse contains fibrous matter of various lengths and sizes, pith cells, ligneous substances, waxy substances, small amounts of sugars and other substances in solution and water. For the purpose of manufacturing insulation board and other products, the fibres and pith cells are valuable.

I have found that the strength and pliability of the fibres may be greatly enchanced by cooking or digesting with small amounts of lime or other chemicals by the addition of heat and pressure up to a certain point. On the other hand, cooking pith cells with the same amount of lime, or other chemicals, using the same temperature and pressure as is found advantageous for the fibres, results in reducing the pith cells to the consistency of mud or slime, of no value in manufacturing insulation board or other products, with attendant waste of chemicals and heat and reduction of the yield of product from the bagasse employed.

I have further discovered that without a certain amount of cooking, it is impossible to bring the pith cells to the same state of hydration as the cooked fibres, which results, on the attempt to admix cooked fibres with uncooked pith cells in a separation of the constituent parts of the mixture, causing a lamination, stratification, and weakening of the resulting product. Also, when fibres and pith cells are cooked together, but with only sufficient chemicals, heat and pressure, so that pith cells are not materially injured, the fibres are not brought to their maximum state of toughness and pliability, with the result that the final product is coarse, relatively weak in tensile and transverse strength, and on account of the freeness of the stock so formed, the product cannot be formed in one homogeneous thickness, but must be manufactured of two or more laminations, which inevitably tend to split and warp when in use. The process now to be described has for its object the surmounting of the above difficulties, with attendant economies in cost of production and superior quality in the insulation board and other products manufactured.

In carrying out the process, I take bagasse as it comes from the sugar mill, without baling or other previous treatment, and separate the pith cells from the fibres as far as is mechanically possible by screening, blowing, or other convenient mechanical means. In general, the pitch cells will form about 15% by weight of the total bagasse, but by reason of varying conditions of cane variety, age of cane, or other conditions, this proportion may at times fall as low as 5% or run as high as 30%.

After separation, the fibrous portion and the pith portion of the bagasse are conveyed by suitable means to separate storage piles which are kept constantly saturated with water to prevent fermentation and heating, with resultant loss of fibre and pith, and to prevent loss of fine particles by blowing away on the wind.

From storage piles, the fibrous portion of the bagasse is conveyed by suitable means to cookers or digesters, preferably of the rotary, spherical type, provided with adequate baffle plates, steam distribution, and proper blow pits. The fibrous portion is cooked or digested with suitable chemicals, preferably hydrated lime in the proportion of about 4% hydrated lime on the quantity of dry fibre, for a period of four (4) hours at 70 pounds steam pressure, but it must be understood that varying conditions may require varying amounts of lime, from 2% to 10% of the weight of dry fibre, steam pressure may be varied from 50 pounds to 125 pounds, and the time of cooking from as high as 10 hours to as low as 30 minutes. I do not limit myself in the practice of this process to the use of hydrated lime, but may use other suitable chemicals such as caustic soda, soda ash, or the like, as the relative price and availability of these various chemicals may render advisable or convenient.

After cooking or digesting as above described, the fibrous portion is discharged from digesters into suitable blow pits, conveyed by suitable means to washers, where any excess of chemical is removed by washing with fresh water, and thence passed through ordinary refining engines, such as pulpers or beaters, in order to reduce the fibres to such size and consistency as may be required for the manufacture of insulation board or other products, the resulting stock flowing to a storage and mixing tank provided with a suitable agitator.

From storage piles, the pith portion of the bagasse is conveyed by suitable means to other cookers, consisting of open tanks provided with suitable agitators and steam coils or inlets, but not arranged for cooking under pressure higher than atmospheric pressure. The pith portion is cooked in water, preferably without addition of other chemicals, for such period as will bring the pith to the same state of hydration as obtains with the fibrous portions after digestion and refining as above described, the time required at 212° F. being ordinarily four (4) hours, through varying conditions may render thirty (30) minutes cooking sufficient in certain cases, while at other times as much as ten (10) hours may be required to attain the desired result. After cooking for the requisite time, the pith portion is allowed to flow into the storage and mixing tank mentioned above, and is mingled with the digested and refined fibrous portion by the action of the above-mentioned agitator.

From the storage and mixing tank, the mingled stock is conveyed or pumped to screens, where any knots, slivers, or oversized fibres may be removed and returned to refiners for additional treatment, thence to deckers; thence to sizing tanks, machine chest, forming machine, press rolls, dryer, and so forth according to the ordinary methods of manufacturing insulation board, or may be passed through other ordinary machines for the formation of other products as may be desired.

I have found that insulation board manufactured from bagasse treated by the herein described process has similar insulating qualities to other boards now on the market, and in addition is lighter in weight for the same thickness and has greater tensile and transverse strength. Moreover, while a small loss of pith will take place in cooking the fibrous portion of the bagasse, due to the mechanical impossibility of removing all the pith from the fibres, nevertheless the final yield of finished board on dry fibre entering the process will exceed 90%, which is a distinct gain over processes and methods now in common use.

What I claim is:

1. The method of treating bagasse for the manufacture of wall board and the like, which comprises separating the fibrous from the pith portions, digesting the fibrous portion to produce a clear fibre, cooking the pith portion with water to effect the desired degree of hydration, and admixing the resultant stocks.

2. The method of treating bagasse for the manufacture of wall board and the like, which comprises separating the fibrous from the pith portions, digesting the fibrous portion with an alkaline reagent to produce a clear fibre, cooking the pith portion with water to effect the desired degree of hydration, and admixing the resultant stocks.

3. The method of treating bagasse for the manufacture of wall board and the like, which comprises separating the fibrous from the pith portions, digesting the fibrous portion with an alkaline reagent to produce a clear fibre, refining the digested fibrous portion, cooking the pith portion with water to effect the desired degree of hydration, and admixing the resultant stocks.

4. The method of treating bagasse for the manufacture of wall board and the like, which comprises separating the fibrous from the pith portions, digesting the fibrous portion with an alkaline reagent under proper conditions of heat and pressure to produce a clear fibre, refining the digested fibrous portion, cooking the pith portion with water to effect the desired degree of hydration, and admixing the resultant stocks.

5. The method of treating bagasse for the manufacture of wall board and the like, which comprises separating the fibrous from the pith portions, digesting the fibrous portion with hydrated lime under proper conditions of heat and pressure to produce a clear fibre, refining the digested fibrous portion, cooking the pith portion with water to effect the desired degree of hydration, and admixing the resultant stocks.

6. The method of treating bagasse for the manufacture of wall board and the like, which comprises mechanically separating the fibrous from the pith portions, digesting the fibrous portion with from 2% to 10% of hydrated lime at pressures from 50 pounds to 125 pounds steam per square inch and for periods of 30 minutes to 10 hours, refining the digested fibrous portion, cooking the pith portion in water at approximately 212° F. for periods from 30 minutes to 10 hours, and admixing the resultant stocks.

In testimony whereof I affix my signature.

WILLIAM L. S. WILLIAMS.